(12) United States Patent
Katschorek et al.

(10) Patent No.: US 7,511,796 B2
(45) Date of Patent: Mar. 31, 2009

(54) FILM AND OPTICAL ANTI-COUNTERFEITING ELEMENT

(75) Inventors: Haymo Katschorek, Obermichelbach (DE); Mathias Seitz, Buckenhof (DE)

(73) Assignee: Leonhard Kurz GmbH & Co. KG, Furth (DE)

( * ) Notice: Subject to any disclaimer, the term of this patent is extended or adjusted under 35 U.S.C. 154(b) by 612 days.

(21) Appl. No.: 10/553,372

(22) PCT Filed: Apr. 8, 2004

(86) PCT No.: PCT/DE2004/000761

§ 371 (c)(1),
(2), (4) Date: Oct. 17, 2005

(87) PCT Pub. No.: WO2004/095090

PCT Pub. Date: Nov. 4, 2004

(65) Prior Publication Data

US 2006/0251863 A1 Nov. 9, 2006

(30) Foreign Application Priority Data

Apr. 17, 2003 (DE) .................. 103 18 157

(51) Int. Cl.
*G02F 1/13* (2006.01)
*G02F 1/1337* (2006.01)
*B42D 15/00* (2006.01)

(52) U.S. Cl. .................. 349/201; 349/129; 283/90; 359/576

(58) Field of Classification Search ............ 349/1, 349/123, 124, 129, 158, 160, 193, 201, 122; 359/566, 567, 584, 569, 570, 574, 586, 571; 283/72, 94, 90, 91; 428/1.5, 1.61

See application file for complete search history.

(56) References Cited

U.S. PATENT DOCUMENTS 5,759,420 A 6/1998 Minnetian et al.
5,759,648 A 6/1998 Idlas (Continued)

FOREIGN PATENT DOCUMENTS

CH 653 161 A5 12/1985

(Continued)

OTHER PUBLICATIONS

"Nanostructures" and frustrated symmetries for LC surface alignment, Vortrag von T. Scharf et al., 31. Arbeitstagung Flussigkristalle vom 19.-21.03.03.

(Continued)

*Primary Examiner*—Dung Nguyen
*Assistant Examiner*—Tai Duong
(74) *Attorney, Agent, or Firm*—Hoffmann & Baron, LLP

(57) ABSTRACT

The invention concerns a film, in particular an embossing film, a laminating film or a sticker film, and an optical security element. The film has a carrier layer and a replication layer. The film also has a layer of a liquid crystal material, which is applied to the replication layer. A diffractive structure is embossed into the surface of the replication layer, which is towards the layer of a liquid crystal material, for orientation of the liquid crystal material, said diffractive structure having at least two partial regions with different directions of orientation of the embossed structure.

27 Claims, 7 Drawing Sheets

U.S. PATENT DOCUMENTS

| | | | |
|---|---|---|---|
| 5,903,330 | A | 5/1999 | Fünfschilling et al. |
| 6,051,289 | A | 4/2000 | Tsujimoto et al. |
| 6,062,604 | A | 5/2000 | Taylor et al. |
| 2002/0110651 | A1 | 8/2002 | Suzushi |
| 2003/0031845 | A1 | 2/2003 | Umeya et al. |
| 2003/0035191 | A1 | 2/2003 | Moia |

FOREIGN PATENT DOCUMENTS

| | | |
|---|---|---|
| EP | 0 704 066 B1 | 4/1996 |
| EP | 1 028 359 A1 | 8/2000 |
| EP | 1 079 245 A2 | 2/2001 |
| EP | 1120737 A1 | 8/2001 |
| EP | 1139152 A1 | 10/2001 |
| EP | 1 203 968 A1 | 5/2002 |
| EP | 1 219 979 A1 | 7/2002 |
| EP | 1 227 347 A1 | 7/2002 |
| EP | 1219979 A1 | 7/2002 |
| EP | 1 336 874 A2 * | 8/2003 |
| EP | 1336874 A2 | 8/2003 |
| JP | 08161449 | 6/1996 |
| JP | 09-048171 | 2/1997 |
| JP | 9048171 | 2/1997 |
| JP | 09-179126 | 7/1997 |
| JP | 10214020 | 8/1998 |
| JP | 11-505046 | 11/1999 |
| JP | 2000304912 | 11/2000 |
| JP | 2000347030 | 12/2000 |
| JP | 2002032023 | 1/2002 |
| JP | 2002067558 | 3/2002 |
| JP | 2002366015 | 12/2002 |
| JP | 2002372610 | 12/2002 |
| RU | 2150392 C1 | 6/2000 |
| TW | 426608 B | 3/2001 |
| WO | WO9428444 | 12/1994 |
| WO | WO 98/52077 | 11/1998 |
| WO | WO0100418 A1 | 1/2001 |
| WO | WO 01/60589 | 8/2001 |
| WO | WO 01/60589 A1 | 8/2001 |
| WO | WO01/60589 A1 | 8/2001 |
| WO | WO 02/085642 | 10/2002 |

OTHER PUBLICATIONS

"Optical document Security" Editor—Rudolf van Renesse, ISBN 0-89006-619-1, 1993.

* cited by examiner

FILM AND OPTICAL ANTI-COUNTERFEITING ELEMENT

CROSS-REFERENCE TO RELATED APPLICATIONS

This application is a National Phase application of International Application No. PCT/DE2004/000761 filed Apr. 8, 2004, which claims priority based on German Patent Application No. 103 18 157.1, filed Apr. 17, 2003, which are both incorporated herein by reference.

BACKGROUND OF THE INVENTION

The invention concerns a substrate, in particular a film, embossing film, laminating film or sticker film, which has a carrier layer and a replication layer. The invention further concerns an optical security element for safeguarding banknotes, credit cards and the like, which has a replication layer.

In the area of liquid crystal display technology, the orientation of liquid crystal polymers (liquid crystal polymers=LCP) in relation to orientation layers is known. Here a polyimide layer is mostly oriented by means of a mechanical brushing process. In a second step in the process liquid crystal polymers are applied to the orientation layer and are then oriented at that orientation layer.

In addition EP 1 227 347 describes the orientation of LCPs at a photopolymer layer.

In that case, a first orientation layer is applied by printing to a substrate by means of an inkjet printer, the orientation layer comprising a photopolymer which can be oriented in a given orientation direction by irradiation with polarized light. That layer is now irradiated with polarized light. A layer of a liquid crystal material is then applied by means of an inkjet printer to the orientation layer and conditions are afforded, under which the liquid crystal material is oriented. The liquid crystal layer is then hardened by means of UV light.

In that respect it is also possible for two orientation layers to be applied in mutually superposed relationship to a substrate. In that case the two layers are respectively irradiated with light polarized in different ways, and then fixed, thus affording orientation layers involving a differing orientation, the layers being arranged in mutually superposed relationship. Regions involving a different orientation can be achieved by virtue of that multiple coating procedure in combination with a corresponding pattern-shaped configuration for the individual, mutually superposed photopolymer layers.

WO 01/60589 proposes forming mutually crossing grooves in an orientation layer for LCD displays, by means of a cutting tool. That produces in that region orientation of a part of the molecules in the one direction and orientation of another part of the molecules in the other direction.

SUMMARY OF THE INVENTION

Now, the object of the invention is to improve the production of optical security elements and/or decorative films.

That object is attained by a substrate, in particular a film, embossing film, laminating film or sticker film, comprising a carrier layer, a replication layer and a layer of a liquid crystal material, which is applied to the replication layer, and wherein a diffractive structure is embossed into the surface of the replication layer, which is towards the layer of a liquid crystal material, for orientation of the liquid crystal material, said diffractive structure having at least two partial regions with different directions of orientation of the embossed structure. The object is further attained by an optical security element for safeguarding banknotes, credit cards and the like, having a replication layer and a layer of a liquid crystal material, which is applied to the replication layer, and wherein a diffractive structure is embossed into the surface of the replication layer, which is towards the layer of a liquid crystal material, for orientation of the liquid crystal material, the diffractive structure having at least two partial regions with different directions of orientation of the embossed structure.

The invention makes it possible to orient liquid crystals specifically in a region and with a high level of precision in different orientation directions, whereby it is possible to produce different kinds of optical security features which are only visible under polarizers and which thus have obvious but easily detectable properties. It is possible in that way to achieve a high degree of safeguard against forgery. In addition the production process is simplified, speeded up and reduced in cost. Thus for example when using photopolymers it is necessary to carry out numerous expensive exposure steps and/or to produce expensive masks.

In this respect, liquid crystals in monomer and polymer form can be used as the liquid crystal material.

Advantageous configurations of the invention are set forth in the appendant claims.

Optical security features which are particularly forgery-resistant can be achieved if the diffractive structure has a region which is coated with the layer of a liquid crystal material and in which the orientation direction of the structure continuously changes. If a security feature produced by means of such a diffractive structure is viewed through a polarizer with for example a rotating polarization direction, then various clearly recognizable security features, for example motion effects, can be produced by virtue of the linearly changing polarization direction of the security element.

In addition it is also desirable for mutually adjoining regions which are coated with the layer of a liquid crystal material to be provided with different orientation directions in respect of the diffractive structure.

Furthermore it is possible for the diffractive structure to have a first region for the orientation of liquid crystal material, which is covered by the layer of a liquid crystal material, and for the diffractive structure to have a second region for producing an optical diffraction effect, for example for producing a hologram or a kinoform. In that way, a security feature based on a polarization effect and a security feature based on a diffraction effect are produced in mutually juxtaposed relationship in one and the same layer. In that way it is possible to produce a security element with a high degree of safeguard against forgery, combined with low production costs. That affords the basis for two different optical effects, by means of one and the same process step.

It is particularly advantageous in that respect if the polarization representation produced in the first region and a holographic representation produced in the second region form a mutually supplemental representation. For example, the holographic representation represents a tree whose leaves are formed by the polarization representation. The contents of the polarization representation and the holographic representation thus supplement each other in terms of content in such a way that a variation in one of the representations is visible immediately from the other representation. That further enhances the level of safeguard against forgery.

It has further proven to be advantageous to use a diffractive structure which is afforded by the superimposition of a first structure for producing an optical effect and a second structure for orientation of the liquid crystal material. It has been found that adequate orientation of the liquid crystal molecules is possible by the superimposed second structure if that second structure is of a higher spatial frequency than the first structure and/or is of a greater profile depth than the first structure. Particularly good orientation effects can be achieved in that respect if the spatial frequency of the second structure is at least ten times higher than the spatial frequency of the first structure or if the spatial frequency of the second structure is greater than 2,500 lines per mm.

The use of that basic principle makes it possible to generate a large number of novel, optically variable elements which on the one hand exhibit a polarization-independent optical effect produced by a macrostructure, a matt structure, a hologram or a kinoform and which on the other hand exhibit a polarization effect generated by oriented liquid crystals.

The combination with an isotropic matt structure (scatter has no preferred direction) affords the advantage that a difference in refractive index which is possibly present between the replication layer and the liquid crystal material or shadow effects or fogging phenomena caused by defects in the orientation of the liquid crystals are compensated and are no longer visible. An additional copier protection is also afforded in that way. Scatter of the polarized light prevents the production of a sufficiently defect-free orientation layer by an exposure process based on photopolymers.

It is further desirable for the layer of a liquid crystal material to cover the diffractive structure only in region-wise manner in a pattern configuration. That affords further design configurations options.

It has proven to be advantageous to provide a protective lacquer layer which covers the layer of a liquid crystal material.

It is further advantageous to vary the profile depth of the diffractive structure and to use that to produce color effects which are visible only under the polarizer.

In accordance with a preferred embodiment of the invention the film has a further layer with a further optically effective diffractive structure or a further effective diffractive structure is embossed on the surface of the replication layer, which is remote from the layer of a liquid crystal material. That optically effective diffractive structure makes it possible to achieve further combinations of optical-diffraction security features and security features which are recognizable only in polarized light. If the further optically effective diffractive structure is superimposed on the diffractive structure acting as an orientation layer, in region-wise manner, it is possible to achieve superimposition in respect of such effects. In addition, arrangement of the two diffractive structures in accurate register relationship makes it possible to provide that the items of information optically represented by those structures supplement each other in respect of content.

A further possible way of enhancing the level of safeguard against forgery provides that the film additionally has a thin film layer system and/or other security features such as for example partial demetalization. There is also the possibility of providing a reflecting layer, in particular a metallic layer or an HRI layer, so that the security element can be in the form of a reflective or partially reflective security element. In addition (partial or full-area) cholesteric liquid crystal layers can also serve as reflectors.

The combination of the layer comprising a liquid crystal material with the above-described layers which have an optical diffraction effect, interference layers and/or reflective layers makes it possible to afford an optical security element with a high degree of safeguard against forgery, the security features of which are strongly intertwined by superimposition or mutual supplementing and thus make manipulation difficult. A further advantage lies in the possibility of superimposing security features recognizable with the human eye with security features recognizable only under polarized light and thus superimposing a non-obvious machine-readable security feature.

There is also the possibility of an optical security element being in the form of a two-part security element in which a partial element has the replication layer and the layer of a liquid crystal material and wherein a second partial element has a polarizer for checking the security feature produced by the layer of a liquid crystal material. In that way, by viewing the first partial feature by way of the second partial feature, it is possible for the user to check the security feature which is not recognizable with the naked eye.

Further advantages are afforded if both partial elements have a layer of a liquid crystal material which is applied to a respective replication layer into which a diffractive structure is embossed for orientation of the liquid crystal material and which has at least two partial regions involving different orientation directions in respect of the embossed structure. The security elements of the two partial elements supplement each other so that by viewing the first partial element by way of the second partial element it is possible for the user to check the security feature of the first partial element, which is not visible with the naked eye.

BRIEF DESCRIPTION OF THE DRAWINGS

The invention is described hereinafter by way of example by means of a number of embodiments with reference to the accompanying drawings in which.

DETAILED DESCRIPTION OF THE INVENTION

Figure 1:
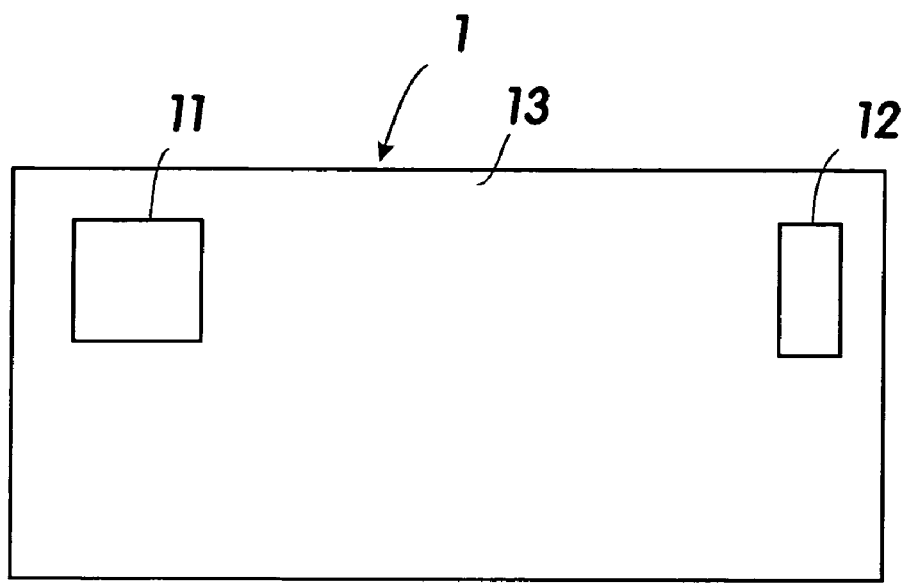
FIG. 1 is a diagrammatic representation of a security document provided with an optical security element according to the invention.

FIG. 1 shows a security document 1 comprising a carrier element 13 and an optical security element comprising two partial elements 11 and 12.

The security document 1 is for example a banknote, an identity card or pass, a ticket or a software certificate. The carrier element 13 comprises for example paper or a flexible plastic material.

The partial element 12 comprises a polarizer which is fitted into a window in the carrier element 13 or which is applied to a transparent region of the carrier element 13. By bending the carrier element 13 it is possible for a user to view the partial element 11 through the partial element 12 and thus to make the polarization effects produced by the partial element 11 visible.

It is also possible to dispense with the partial element 12 and to apply only the partial element 11 to the security document.

In that case the carrier element 13 can also comprise an inflexible material so that the security document 1 is for example a credit card. In that case the carrier element 13 comprises a conventional plastic card, on the front side of which is embossed for example the name of the card holder. In that respect it is possible for that plastic card to have a transparent region in the region of the optical security element so that the optical security element can be a transmissive optical security element.

Reference will now be made to FIGS. 2 through 9 to set out various possible ways of producing and designing an optical security element according to the invention which can also be used as the partial element 11 in FIG. 1.

Figure 2:
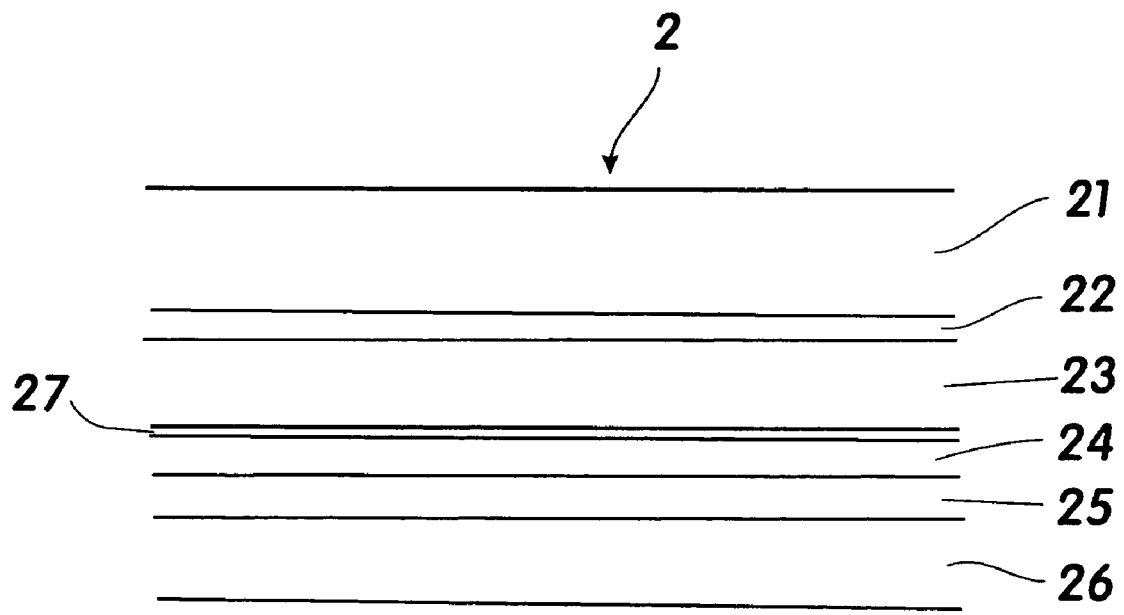
FIG. 2 shows a view in section through an embossing film according to the invention.

FIG. 2 shows an embossing film 2 having six layers 21, 22, 23, 24, 25 and 26.

The layer 21 is a carrier layer which for example is of a thickness of about between 12 µm and 50 µm and is formed by a polyester film. The layers 22, 23, 24, 25 and 26 form the transfer layer assembly of the embossing film 2.

The layer 22 is a release or protective lacquer layer which is preferably of a thickness of between about 0.3 and 1.2 µm. It would also be possible to dispense with that layer.

The layer 23 is a replication layer, into which diffractive structures can be embossed by means of an embossing tool. In this respect the replication layer 23 preferably comprises a transparent thermoplastic material which can be applied for example by a printing process.

In this respect the replication lacquer is for example of the following composition:

| Components | Parts by weight |
| --- | --- |
| High-molecular PMMA resin | 2000 |
| Silicone alkyd oil-free | 300 |
| Non-ionic wetting agent | 50 |
| Low-viscosity nitrocellulose | 750 |
| Methylethylketone | 12000 |
| Toluene | 2000 |
| Diacetone alcohol | 2500 |

The carrier layer 21 comprises for example a PET film of a thickness of 19 µm, to which the above-specified replication lacquer is applied with a line raster intaglio printing cylinder, more specifically with an application weight of 2.2 g/m² after drying. Drying is effected in the drying passage at a temperature of between 100 and 120° C.

The diffractive structure 27 is then embossed into the layer 23 at about 130° C. by means of a die which for example comprises nickel. The die is preferably heated electrically for embossing the diffractive structure 27. The die can be cooled down again before lifting the die off the layer 23 after the embossing operation. After the diffractive structure 27 has been embossed into the layer 23, the replication lacquer is hardened by cross-linking or in some other fashion.

The layer 24 is a liquid comprising a liquid crystal material (LC=liquid crystal). The layer 24 is preferably of a thickness of between 0.5 µm and 5 µm. In principle all possible kinds of liquid crystal materials can be used, which have the desired optical properties. Examples in that respect are liquid crystal materials from OPALVA O—series from Vantico AG, Basel, Switzerland.

The liquid crystals are then oriented at a layer 23 serving as an orientation layer with the application of some heat. That is followed by UV hardening of the liquid crystal material for fixing the orientation of the liquid crystal molecules.

It is also possible for the layer which is applied by printing and comprises a solvent-bearing liquid crystal material to be subjected to a drying process and for the liquid crystal molecules to be oriented during evaporation of the solvent in accordance with the diffractive structure 27. It is also possible for solvent-free liquid crystal material to be applied by a printing process and fixed after orientation by cross-linking.

The layer 25 is a protective lacquer layer which is applied to the layer 24 for example by a printing process. It would also be possible to dispense with the layer 25. The layer 25 is for example of a thickness of between 0.5 µm and 3 µm and preferably comprises UV cross-linkable acrylates and abrasion-resistant thermoplastic acrylates.

The layer 26 is an adhesive layer which for example comprises a thermally activatable adhesive.

To apply the embossing film 2 to a security document or to an article to be safeguarded, the embossing film 2, with the transfer layer assembly formed by the layers 21 through 26 leading, is applied to the security document or the article to be safeguarded and then pressed against the security document or the article to be safeguarded, under the action of heat. In that case the transfer layer assembly is joined by way of the adhesive layer 26 to the corresponding surface of the security document or the article to be safeguarded. As a consequence of the production of heat the transfer layer assembly is then released from the carrier layer 21. In that case detachment of the transfer layer assembly from the carrier layer 13 is facilitated by the preferably wax-like release layer 22.

The embossing film 2 can also be a film of a different kind, for example a laminating film. In that case the layer 22 would be replaced by a further layer which possibly improves adhesion to the carrier.

Figure 3:
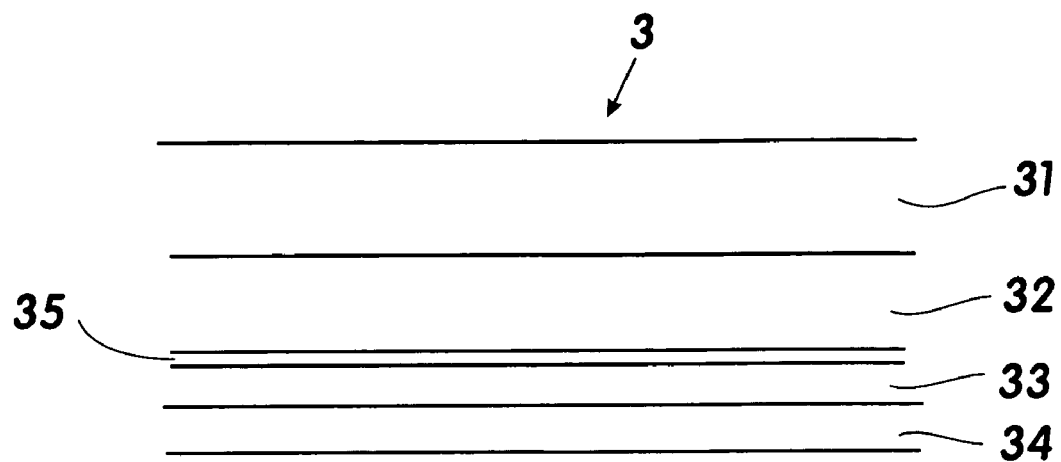
FIG. 3 shows a view in section through a sticker film according to the invention.

FIG. 3 shows a sticker film 3 comprising four layers 31, 32, 33 and 34.

The layer 31 is a carrier layer which for example comprises a transparent, partly transparent or non-transparent polyester material of a thickness of between 12 µm and 15 µm. The layer 32 is a replication layer into which a diffractive structure 35 is embossed. The layer 33 is a layer of a liquid crystal material and the layer 34 is a protective lacquer layer. In this respect the layers 32, 33 and 34 can be like the layers 23, 24 and 25 of FIG. 2. It would also be possible to dispense with the layer 34.

Figure 4:
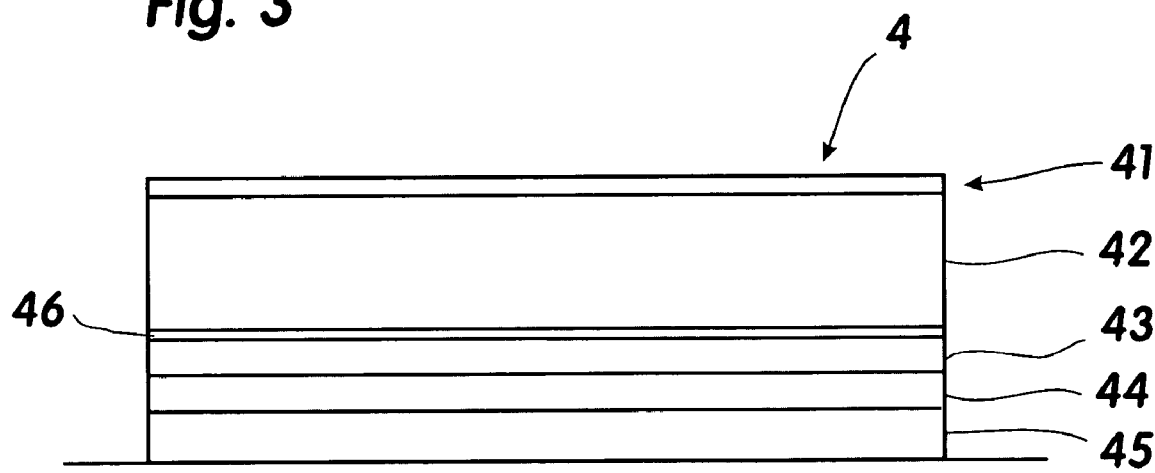
FIG. 4 shows a diagrammatic sectional view of an optical security element according to the invention applied to a value-bearing document.
Figure 4:
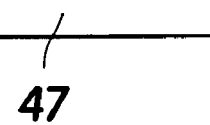

FIG. 4 shows an optical security element 4 and a substrate 47 to which the optical security element 4 is applied. The substrate 47 is for example a security document which is to be safeguarded, for example the base element 13 shown in FIG. 1. The optical security element 4 has five layers 41, 42, 43, 44 and 45. The layer 41 is a protective lacquer layer. The layer 42 is a replication layer into which a diffractive structure 46 is embossed. The layer 43 is a layer of a liquid crystal material, the layer 44 is a protective lacquer layer and the layer 45 is an adhesive layer which glues the layer 44 to the substrate 47. The layers 41, 42, 43, 44 and 45 are for example like the layers 21, 22, 23, 24, 25 and 26 of FIG. 2.

Figure 5A:
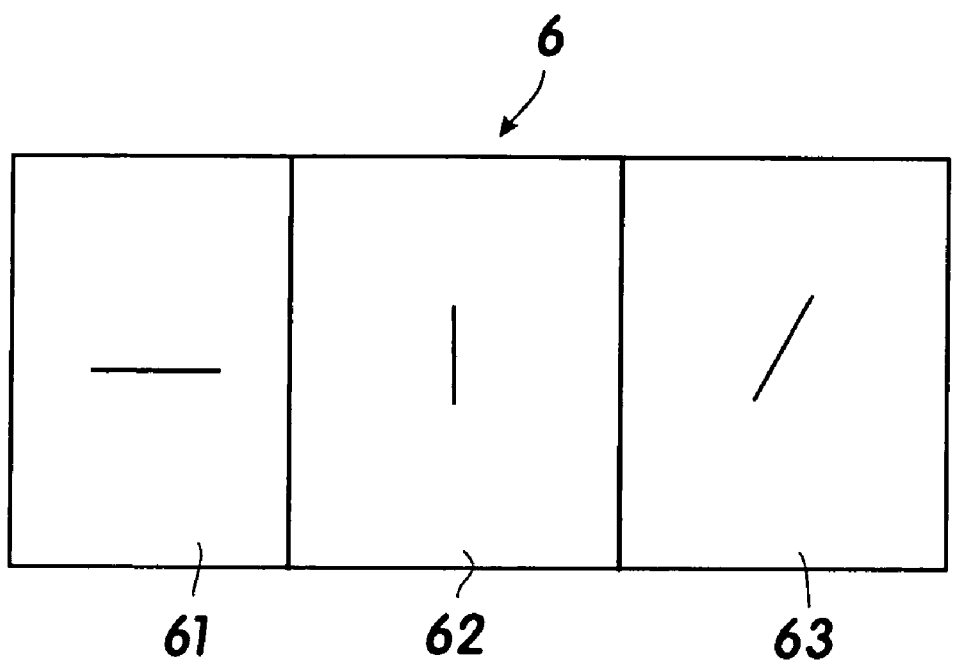
FIG. 5a shows a plan view of an optical security element according to the invention.

Reference is now made to FIG. 5a showing further possible ways in which the diffractive structures 27, 35 and 46 are to be formed.

FIG. 5a shows an optical security element 6 which can be divided into a plurality of regions 61, 62 and 63.

The regions 61, 62 and 63 are embossed with a diffractive structure over their full surface area. The diffractive structure comprises for example a plurality of mutually juxtaposed parallel grooves which permit orientation of liquid crystal molecules. For example those grooves involve a spatial frequency of between 300 and 3000 lines/mm and a profile depth of between 200 nm and 600 nm. It is also possible to envisage shallower depths, for example in the region of 50 nm. Particularly good orientation results can be achieved in that respect by diffractive structures whose spatial frequencies are established in the region of between 1000 and 3000 lines/mm. In that respect the longitudinal direction of those grooves represents the orientation direction of the diffractive structure.

It is further possible to vary the profile depth of the grooves. Upon application of the liquid crystal material, for example by means of a squeegee or doctor member, that affords different thicknesses in respect of the layer of a liquid crystal material, in different regions of the film. That leads to the production of color effects which are visible only under the polarizer.

Those effects can further also be produced by the use of deep grooves which in the printing process are filled in region-wise manner to different heights with liquid crystal material (for example by means of a suitable raster roller with a different application weight and/or by using a chamber-type doctor member).

Interplays of colors and patterns can also be produced by using suitable carrier materials, for example by virtue of birefringence. In that respect, by specifically setting the orientation direction of the liquid crystal material, it is also possible to produce an attractive color interplay which occurs by virtue of the interaction of the liquid crystals with the structured carrier material (for example by a variation in the angles in the structure layer or by the formation of guilloche figures).

The orientation direction of the diffractive structure is different in the regions 61, 62 and 63. Thus the region 61 for example has a plurality of parallel, horizontally arranged grooves, the region 62 has a plurality of vertically arranged parallel grooves and the region 63 has a plurality of parallel grooves which are tilted through 30° with respect to the perpendicular. The diffractive structure is thus oriented horizontally in the region 61, vertically in the region 62, and tilted through 30° relative to the vertical in the region 63.

It is further possible for the diffractive structure to be formed by a plurality of grooves whose orientation direction changes along the grooves. Thus for example the orientation direction of the diffractive structure can change continuously along the horizontal or vertical axis in the region 61. That makes it possible to produce for example motion effects or gray scale configurations.

In addition it is also possible for the optical security element 6 to have a plurality of regions involving different orientation directions in respect of the embossed structure, the size of which is preferably below the range which can be resolved by the human eye. Those regions form pixels of different, mutually superimposed polarization representations which are more or less visible in dependence on the polarization direction of the incident light.

In addition it is also possible for diffractive structures to be embossed only in the region 62, for orientation of the liquid crystal material, and for the diffractive structures in the regions 61 and 63 to serve for producing an optical diffraction effect, in particular for producing a hologram, a kinegram or the like.

Figure 5B:
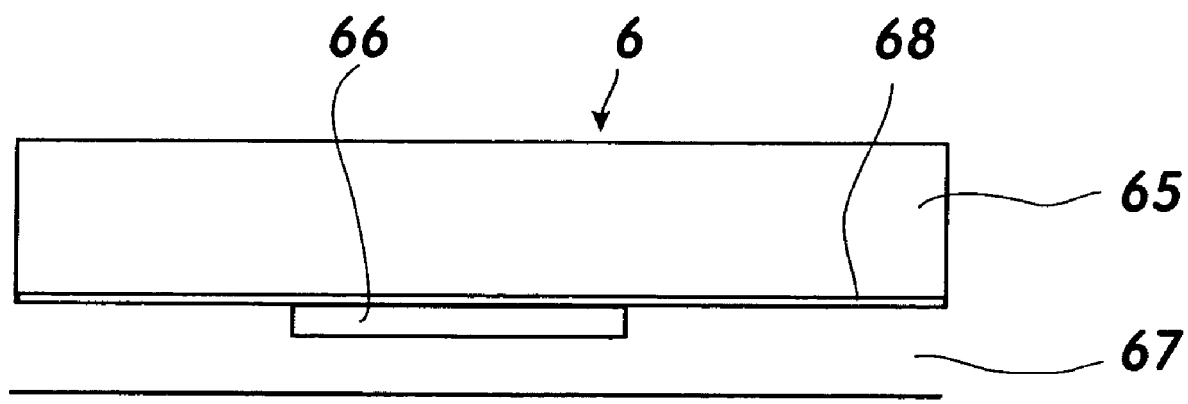
FIG. 5b shows a sectional view of the security element of FIG. 5a, FIGS. 6a through 6e show diagrammatic views of diffractive structures for the orientation of liquid crystal molecules.

As shown in FIG. 5b the optical security element 6 thus has a replication layer 65, a layer of a liquid crystal material 66 and an adhesive layer 67. A diffractive structure 68 is embossed into the replication layer 65.

The replication layer 65, the layer 66 and the adhesive layer 67 are for example like the layers 23, 24 and 26 respectively shown in FIG. 2.

As illustrated in FIG. 5b the layer 66 is applied by printing to the replication layer 62 only in region-wise fashion in the region 62. In the regions 61 and 63, the diffractive structure 68 is not coated with liquid crystal material so that in those regions, no polarization effect is produced, by oriented liquid crystal molecules. Accordingly, a polarization representation is produced only in the region 62. In contrast, the optical diffraction effect caused by the diffractive structure 68 is useful in the regions 61 and 63.

By virtue of such a configuration, the optical security element 6 produces an optical representation which is composed of a polarization representation in the region 62 and two flanking holographic representations in the regions 61 and 63.

Preferably those holographic representations and the polarization representation are representations which supplement each other in respect of content and which for example form a common word or a common graphic representation. Depending on the respectively selected common image or the common word to be represented, two or more of the regions 61 through 63 can be arranged in mutually juxtaposed relationship in any representation. For example it is possible to envisage the representation of a holographic tree whose leaves are formed by polarization representations and are thus visible only when viewed in polarized light or by way of a polarizer.

In addition it is possible to use a diffractive structure which arises out of the superimposition of a first structure for producing an optical effect and a second structure for orientation of the liquid crystal material. It has been found in that respect that orientation of the liquid crystal molecules by the second structure is possible if that second structure involves a higher spatial frequency (coarse structure-fine structure) and/or is of a greater profile depth than the first structure.

That will now be described hereinafter with reference to FIGS. 6a through 6e which show diagrammatic representations of diffractive structures 51 through 55 of that kind.

The diffractive structure 51 is an additive superimposition of a fine structure, for example a zero-order diffractive structure, and a microscopically fine, light-scattering coarse structure. The microscopically fine, light-scattering coarse structure is a structure from the group consisting of isotropically or anisotropically scattering matt structures, kinoforms or Fourier holograms.

In addition it is also possible to use as the coarse structure a macrostructure having a spatial frequency of less than 300 lines per mm so that the polarization effect produced by the liquid crystals is superimposed with a polarization-dependent optical effect produced by the macrostructure. By way of example sawtooth profiles or microlenses can be used as the macrostructures.

The diffractive structures 52 through 55 each have a respective structure diffracting visible incident light, with a profile height whose relief function is a superimposition of a low-frequency grating structure $G(x, y)$ with a high-frequency relief structure $R(x, y)$. The low-frequency grating structure $G(x, y)$ is of a known profile, for example a sinusoidal, rectangular, a symmetrical or asymmetrical sawtooth-shaped profile and so forth. The high-frequency relief structure $R(x, y)$ involves a spatial frequency $f_R$ of preferably at least 2,500 lines per millimeter. On the other hand the low-frequency grating structure G(x, y) is of a low grating-spatial frequency fG of for example less than 1,000 lines/millimeter. Preferably the grating-spatial frequency fG is of a value of between 100 lines/millimeter and 500 lines/millimeter.

The relief-profile height hR of the relief structure R(x, y) is of a value from the range of between 150 nm and 220 nm; preferably the relief-profile height hR however is selected from the narrower range of between 170 nm and 200 nm. The grating-profile height hG of the grating structure G(x, y) is to be selected at a greater value than the relief-profile height hR. The grating-profile height hG is preferably of a value from the range of between 250 nm and 500 nm.

The low-frequency grating structure G(x, y) defracts the incident light in dependence on the grating-spatial frequency fG into a plurality of diffraction orders and accordingly produces an optical diffraction effect. The high-frequency relief structure serves for orientation of the liquid crystal material.

Figure 6A:
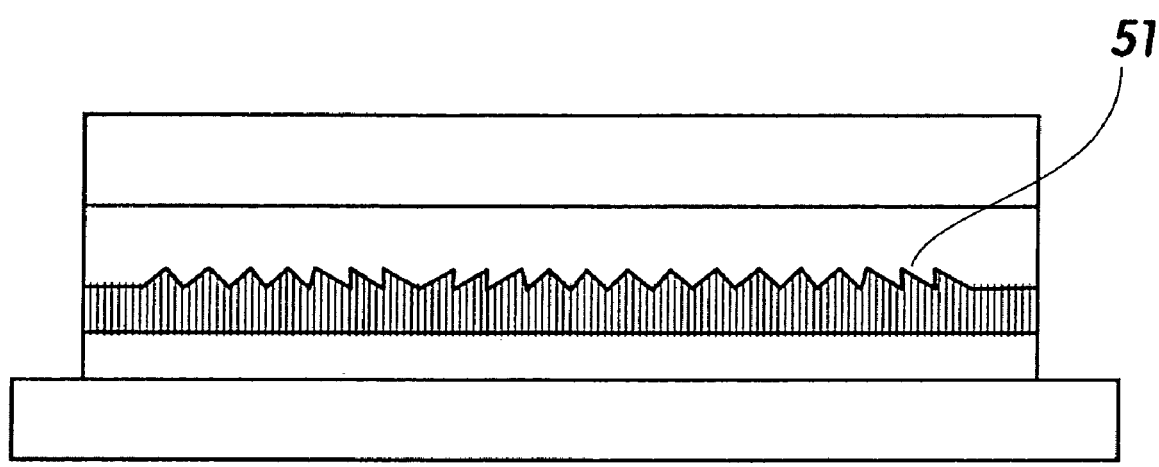
Figure 6B:
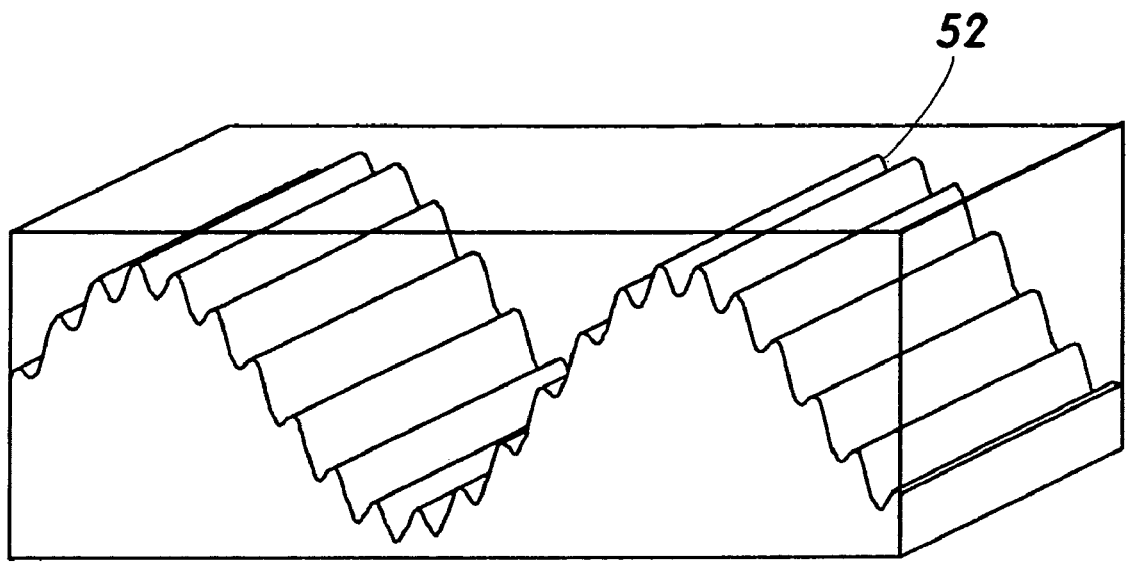

The diffractive structure B(x) shown in FIG. 6b is the result of additive superimposition of the sinusoidal grating structure G(x) with the sinusoidal relief structure R(x), that is to say B(x)=G(x)+R(x). A grating vector of the grating structure G(x) and a relief vector of the relief structure R(x) are oriented substantially parallel.

Figure 6C:
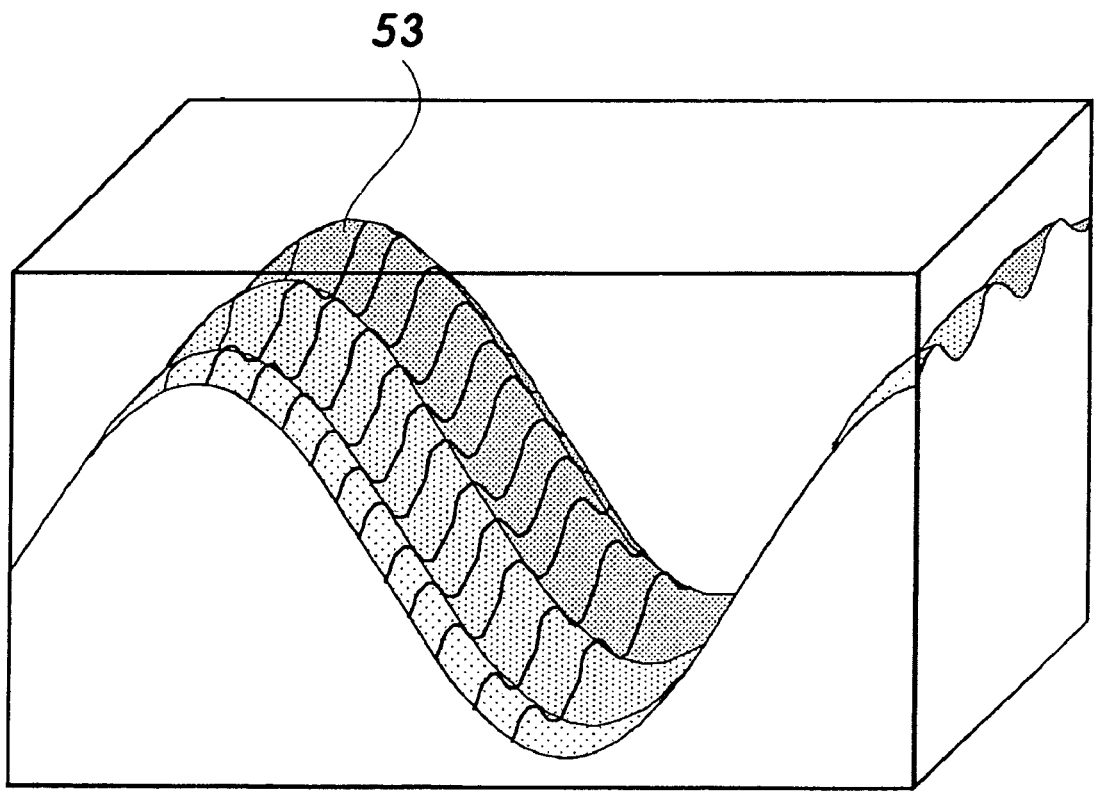

FIG. 6c shows a diffractive structure B(x) in which the grating vector and the relief vector are oriented in mutually orthogonal relationship in the plane of the co-ordinates x and y. By way of example the sinusoidal grating structure G(x) is only a function of the co-ordinate x while the sinusoidal relief structure R(y) is dependent only on the co-ordinate y. The additive superimposition of the grating structure G(x) with the relief structure R(y) affords the diffractive structure B(x, y) which is dependent on both co-ordinates x, y, wherein B(x, y)=G(x)+R(y). For reasons relating purely to clarity of the drawing, in FIG. 6c the interface with the valleys which are disposed one behind the other of the relief structure R(y) are indicated with dot patterns of varying densities.

Figure 6D:
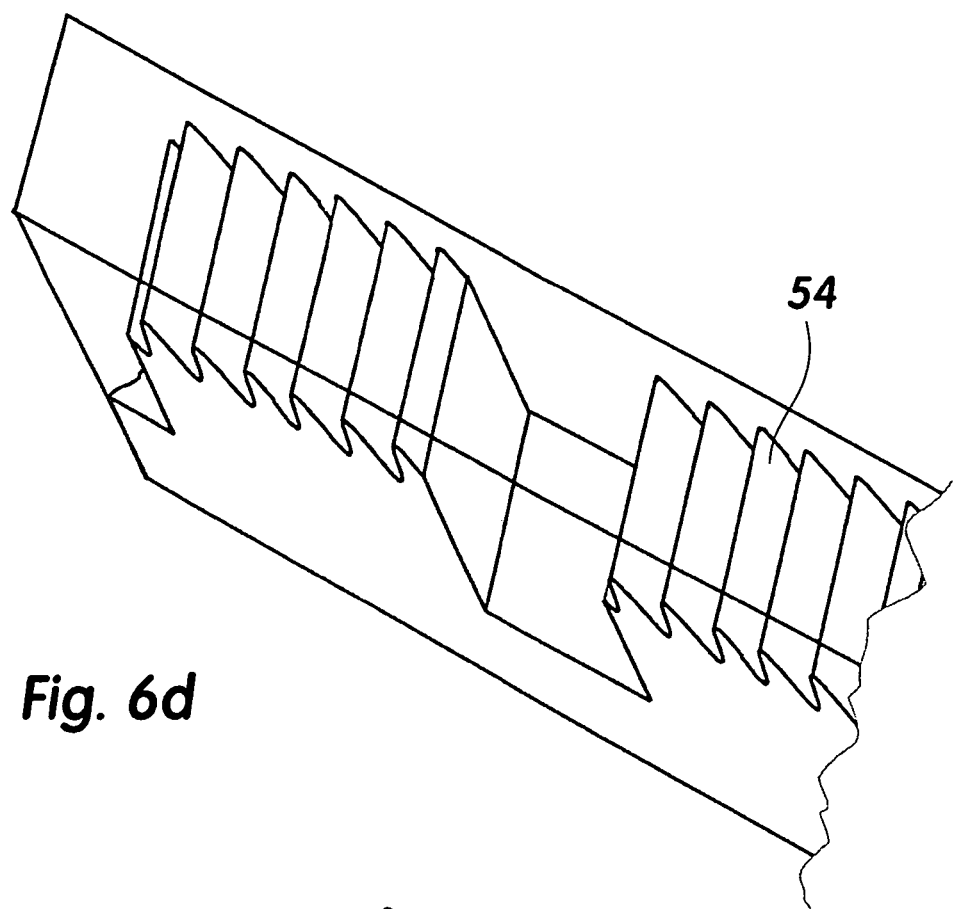

The diffractive structure B(x) in FIG. 6d is a multiplicative superimposition B(x)=G(x)·{R(x)+C}. The grating structure G(x) is a rectangular function with the function values [0, $h_G$], a period of 4000 nm and a profile height $h_G$=320 nm. The relief structure R(x)=0.5·$h_R$·sin(x) is a sine function with a period of 250 nm and a profile height $h_R$=200 nm. C denotes a constant, wherein C=$h_G$−$h_R$. The diffractive structure 54 is modulated on the raised surfaces of the rectangular structure with the relief structure R(x), while the diffractive structure 54 on the bottom of the grooves of the rectangular structure is smooth.

Figure 6E:
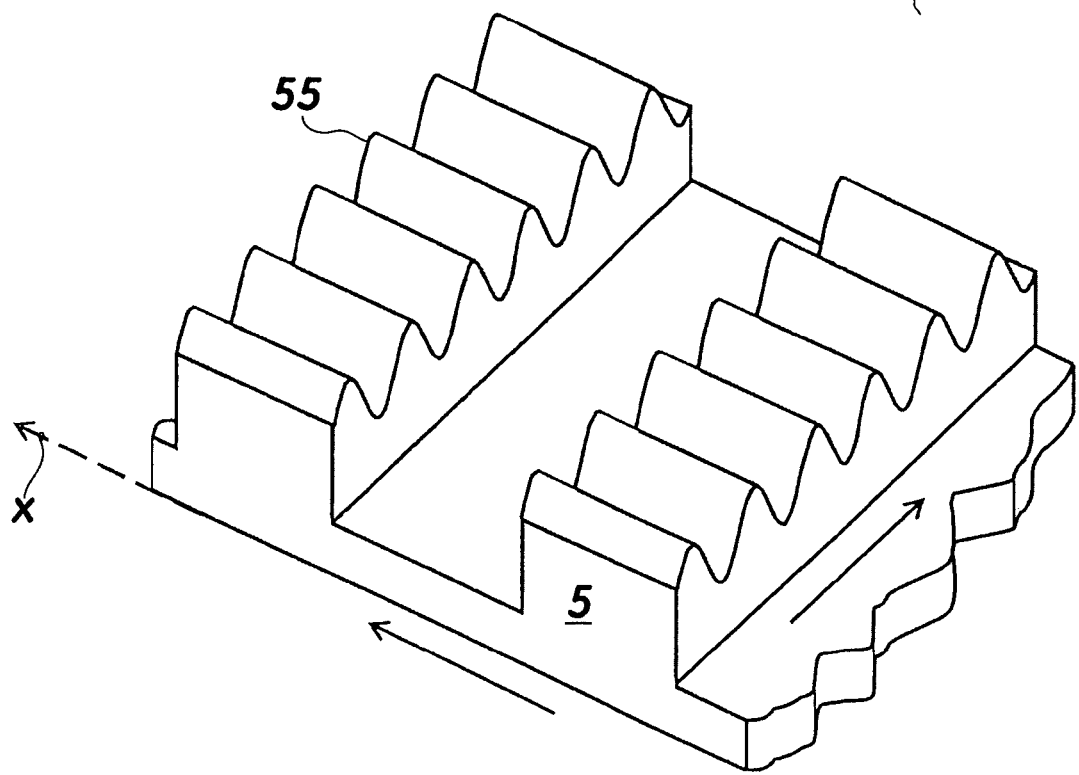

In FIG. 6e the multiplicative superimposition of the rectangular grating structure G(x) with the relief structure R(y) produces the diffractive structure B(x,y). The grating structure G(x) and the relief structure R(y) have the same parameters as in the case of the diffractive structure 54, with the exception of the relief vector which points in the direction of the co-ordinate y.

In addition it is also possible for the films 2 and 3 and the optical security elements 4 and 6 to have further layers into which further optically effective diffractive structures are embossed. The further layers can be of a metal, form a thin film layer system for producing color shifts by means of interference and/or have reflective properties. Further advantageous effects can be achieved by a partial configuration in respect of those layers.

Some possible ways of providing further layers of that kind in the films 2 and 3 and the security elements 4 and 6 will now be described with reference to FIGS. 7 through 9.

Figure 7:
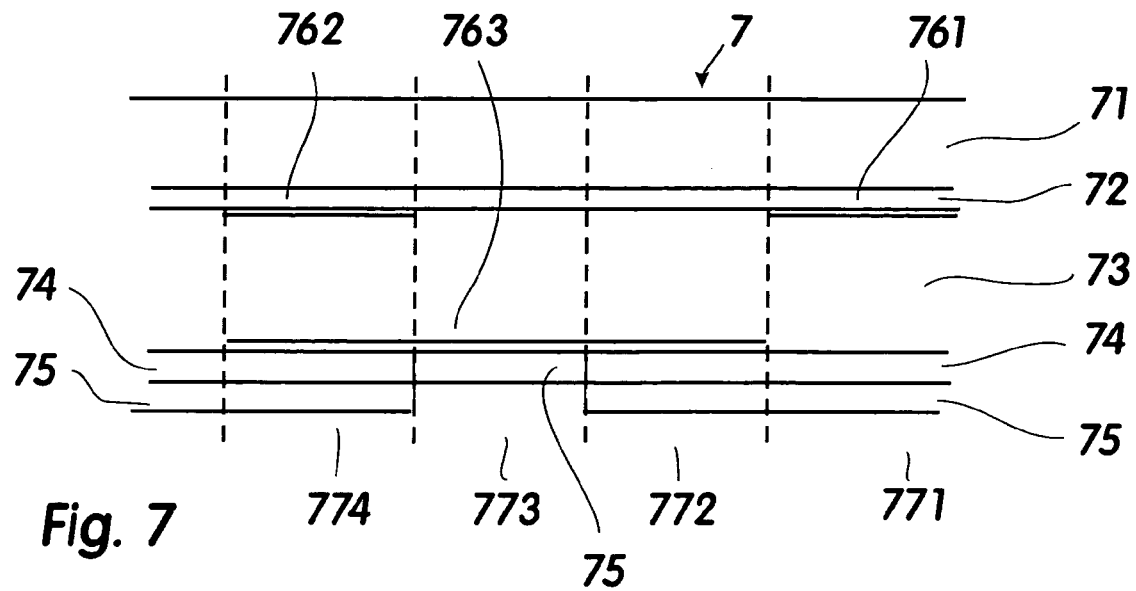
FIG. 7 shows a sectional view of a film according to the invention in a first embodiment.

FIG. 7 shows an embossing film 7 comprising a carrier layer 71 and a transfer layer assembly comprising layers 72, 73, 74 and 75. The layer 72 is a protective lacquer layer. The layer 73 is a replication layer into which diffractive structures 761, 762 and 763 are embossed. The layer 74 is a reflective layer and the layer 75 is an adhesive layer.

The embossing film 7 has regions 771 through 774 in which the embossing film is of different configurations.

The layers 71, 72, 73 and 75 are like the layers 21, 22, 23 and 26 respectively. The layer 74 is a thin, vapor-deposited metal layer or an HRI layer (HRI=high refraction index). The material for the metal layer is essentially chromium, aluminum, copper, iron, nickel, silver or gold or an alloy with those materials.

In that respect it is also possible for the reflection layer 74 to be formed only partially and in a pattern configuration, thereby to provide an optical security element having properties which are reflective or transmissive in region-wise manner.

The diffractive structures 761 and 762 are embossed into the regions 771 and 774 respectively of the embossing film 7. The diffractive structure 763 is embossed into the replication layer 73 in the regions 772, 773 and 774 of the embossing film 7. The diffractive structures 761 and 762 on the one hand and 763 on the other hand are embossed into the replication layer 73 on oppositely disposed sides, the diffractive structures 762 and 763 being in mutually superposed relationship in the region 774. The layer 74 is disposed on the replication layer 73 only in region-wise manner so that the diffractive structure 763 is coated with a layer of liquid crystal material only in the regions 774 and 772.

Accordingly the different optical effects in the regions 771 through 774 are as follows:

The diffraction effect produced by the diffractive structure 761 takes effect in the region 761, thus affording here for example a reflective, holographic representation. A polarization representation and a holographic representation, both reflective, are produced in the regions 762 and 773 by the diffractive structure 763, in mutually juxtaposed relationship, as depicted for example in the embodiment shown in FIG. 6. In the region 774 the optical-diffraction effect produced by the diffractive structure 762 is superimposed by the polarization effect produced by the layer 74 so that for example a holographic representation changes with a change in the polarization direction of the incident light.

Figure 8:
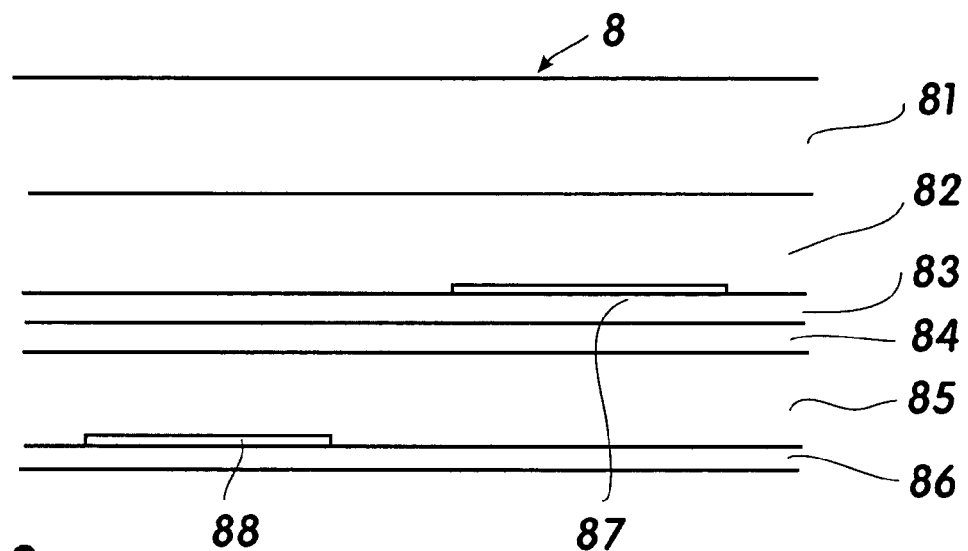
FIG. 8 shows a sectional view of a film according to the invention for a second embodiment.

FIG. 8 shows a sticker film 8 comprising six layers 81, 82, 83, 84, 85 and 86. The layer 81 is a carrier layer. The layers 82 and 85 are replication layers into which diffractive structures 87 and 88 respectively are embossed. The layer 83 is a layer of a liquid crystal material. The layers 84 and 86 are adhesive layers.

The layers 81, 82 and 85, 83 as well as 84 and 86 are for example like the layers 31, 32, 33 and 34 respectively shown in FIG. 3.

The sticker film 8 is produced like the sticker film 3 in FIG. 3. The procedure then involves laminating onto the film body produced in that way, the replication layer 85 with the diffractive structure 88 and the adhesive layer 86, for example by means of a laminating film.

Besides the positioning of the diffractive structures 87 and 88 shown in FIG. 8, it is also possible for the diffractive structures 87 and 88 to be positioned like the diffractive structures 763, 761 and 762 respectively as shown in FIG. 7 and to be combined with a partially formed layer 83. In that way it is possible to achieve by means of the layer structure illustrated in FIG. 8, the same effects as in the case of the layer structure shown in FIG. 7.

It is further possible for the layer 83 to be arranged beneath the layer 85 so that the diffractive structure 87 only has an optical-diffraction effect.

Figure 9:
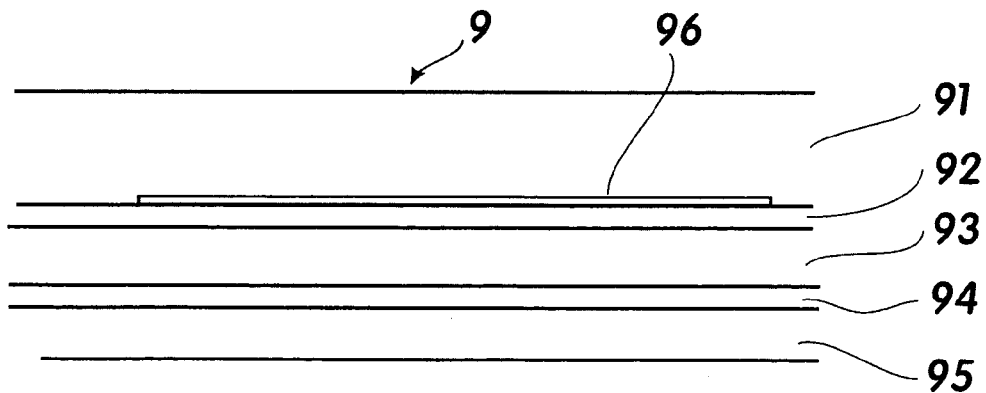
FIG. 9 shows a sectional view of an optical security element according to the invention for a third embodiment.

FIG. 9 shows an optical security element 9 comprising five layers 91, 92, 93, 94 and 95. The layer 91 is a replication layer into which a diffractive structure 96 is embossed. The layer 92 is a layer comprising a liquid crystal material. The layer 94 is a reflection layer. The layers 93 and 92 form a thin film layer system which produces color shifts which are dependent on the angle of view, by means of interference. The layer 95 is an adhesive layer.

The layers 91, 92 and 95 are like the layers 23, 24 and 26 shown in FIG. 2. The layer 94 is like the layer 75 shown in FIG. 7.

The thin film layer system comprises an absorption layer (preferably with between 30 and 65% transmission), a transparent spacer layer as a color change-producing layer ($\lambda/4$ or $\lambda/2$ layer) and an optical separation layer (provision of a transmissive element) or a reflective layer (provision of a reflective element). In that case the thickness of the spacer layer is so selected that, when providing a reflective element, the $\lambda/4$ condition is fulfilled and when providing a transmissive element the $\lambda/2$ condition is fulfilled, wherein $\lambda$ is preferably in the range of light which is visible to a human viewer.

The absorption layer can comprise for example one of the following materials or an alloy of the following materials: chromium, nickel, palladium, titanium, cobalt, iron, tungsten, iron oxide or carbon.

The optical separating layer can be in particular materials such as oxides, sulfides or chalcogenides. What is crucial in terms of the choice of the materials is that there is a difference in refractive index, in relation to the materials used in the spacer layer. That difference should preferably be not less than 0.2. Depending on the respective materials used for the spacer layer therefore, an HRI material or an LRI material (HRI=high refraction index; LRI=low refraction index) is used.

In addition it is also possible to make up a thin film layer sequence which produces a color shift dependent on the angle of view by means of interference, from a succession of high-refraction and low-refraction layers. When such a layer structure is involved, it is possible to dispense with the use of an adsorption layer. The high-refraction and low-refraction layers of such a thin film layer sequence respectively form an optically effective spacer layer which has to comply with the above-described conditions. The greater the number of layers adopted, the correspondingly sharper it is possible to set the wavelength of the color change effect. It is particularly advantageous in that respect for such a thin film layer sequence to be made up from between 2 and 10 layers (even-numbered variant) or between 3 and 9 layers (odd-numbered variant).

Examples of ordinary layers of such a thin film layer sequence and examples of materials which in principle can be used for the layers of such a thin film layer sequence are disclosed for example in WO 01/03945, page 5, line 30 through page 8, line 5.

In the region of the diffractive structure 96, the optical interference effect produced by the thin film layer system 93 is thus superimposed with the polarization effect produced by the layer 92. A color change effect which is dependent on the angle of view and which is produced by the thin film layer system 93 thus occurs for example in dependence on the polarization direction of the incident light, only for a partial region of the optical security element 9. In addition it is also possible for the diffractive structure 96 and the layer 92 to be like the diffractive structure 68 and the layer 66 shown in FIG. 6 and thus to achieve a combination of diffractive effects, optical-diffraction effects and polarization effects.

What is claimed is:

1. A film, comprising a carrier layer and a replication layer and a release layer which is arranged between the carrier layer and the replication layer,
wherein the film further comprises a layer of a liquid crystal material, which is applied to the replication layer and wherein a diffractive structure is embossed into the surface of the replication layer which is towards the layer of a liquid crystal material, for orientation of the liquid crystal material, said diffractive structure having at least two partial regions with different directions of orientation of the embossed structure and liquid crystal molecules of the layer of a liquid crystal material are oriented in accordance with the diffractive structure.

2. A film as set forth in claim 1, wherein the diffractive structure comprises a region in which the orientation direction of the structure continually changes and which is coated with the layer of a liquid crystal material.

3. A film as set forth in claim 1, wherein the diffractive structure comprises mutually adjoining regions involving differing orientation directions, which are coated with the layer of a liquid crystal material.

4. A film as set forth in claim 1, wherein the diffractive structure comprises a first region for the orientation of liquid crystal material, which is covered by the layer of a liquid crystal material, and wherein the diffractive structure has a second region for producing an optical diffraction effect.

5. A film as set forth in claim 4, wherein a polarization representation produced in the first region and a holographic representation produced in the second region form a mutually supplementing representation.

6. A film as set forth in claim 1, wherein the diffractive structure comprises a region in which the diffractive structure is formed from a superimposition of a coarse structure for producing an optical effect with a fine structure of a higher spatial frequency for orientation of the liquid crystal material.

7. A film as set forth in claim 6, wherein the fine structure comprises a period of less than 400 nm.

8. A film as set forth in claim 6, wherein the spatial frequency of the fine structure is at least ten times higher than the spatial frequency of the coarse structure.

9. A film as set forth in claim 6, wherein the coarse structure is a light-scattering structure, in particular an isotropic matt structure with a period of between 500 nm and 1 pm.

10. A film as set forth in claim 6, wherein the coarse structure is a macrostructure with a spatial frequency of less than 300 lines per mm.

11. A film as set forth in claim 1, wherein the diffractive structure has a region in which the diffractive structure is formed from a superimposition of a first structure for producing an optical effect with a second structure of greater profile depth for the orientation of the liquid crystal material.

12. A film as set forth in claim 11, wherein the profile depth of the second structure is at least 100 nm greater than that of the first structure, wherein the profile depth of the first structure is in particular of a value from the range of between 250 nm and 400 nm.

13. A film as set forth in claim 1, wherein the layer of a liquid crystal material covers the diffractive structure in region-wise manner in a pattern configuration.

14. A film as set forth in claim 1, wherein one of the layers is of region-wise differing thickness.

15. A film as set forth in claim 1, wherein color interplays are produced by targeted orientation variations in the diffractive structure.

16. A film as set forth in claim 1, wherein the film comprises a protective lacquer layer which covers the layer of a liquid crystal material.

17. A film as set forth in claim 1, wherein the film has a further layer with a further optically effective diffractive structure.

18. A film as set forth in claim 1, wherein a further optically effective diffractive structure is embossed on the surface of the replication layer, which is remote from the layer of a liquid crystal material.

19. A film as set forth in claim 17 wherein the further optically effective diffractive structure overlies the diffractive structure at least in region-wise manner.

20. A film as set forth in claim 8, wherein the further optically effective structure only partially covers the further layer or the replication layer.

21. A film as set forth in claim 1, wherein the film has a thin film system for producing color shifts by means of interference.

22. A film as set forth in claim 21, wherein the thin film layer system overlies the diffractive structure at least in region-wise manner.

23. A film as set forth in claim 1, wherein the thin film has a reflecting layer.

24. A film as set forth in claim 23, wherein the reflecting layer is a partial layer.

25. An optical security element for safeguarding banknotes, credit cards, wherein the optical security element comprises a replication layer and a release layer, wherein the optical security element further comprises a layer of a liquid crystal material, which is applied to the replication layer, and wherein a diffractive structure is embossed into the surface of the replication layer, which is towards the layer of a liquid crystal material, for orientation of the liquid crystal material, said diffractive structure having at least two partial regions with different directions of orientation of the embossed structure and liquid crystal molecules of the layer of the liquid crystal material are oriented in accordance with the diffractive structure.

26. An optical security element as set forth in claim 25, wherein the optical security element is a two-part security element, wherein a first partial element has the replication layer and the layer of a liquid crystal material and the second partial element has a polarizer for checking the security feature produced by the layer of a liquid crystal material.

27. An optical security element as set forth in claim 25, wherein the optical security element is a two-part or multi-part security element comprising two or more partial elements, wherein both a first partial element and also a second partial element has a layer of a liquid crystal material which is applied to a replication layer into which a diffractive structure for orientation of the liquid crystal material is embossed and which has at least two partial regions with different orientation directions in respect of the embossed structure, and wherein the second partial element serves for checking of the security feature produced by the first partial element.

* * * * *